(12) United States Patent
Miller et al.

(10) Patent No.: US 9,769,297 B2
(45) Date of Patent: Sep. 19, 2017

(54) SYSTEM AND METHOD FOR MONITORING THE LOCATION OF A COMMUNICATION DEVICE IN A VEHICLE

(75) Inventors: Thomas Lee Miller, Ann Arbor, MI (US); Robert Bruce Kleve, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1742 days.

(21) Appl. No.: 13/117,730

(22) Filed: May 27, 2011

(65) Prior Publication Data

US 2011/0301780 A1    Dec. 8, 2011

Related U.S. Application Data

(60) Provisional application No. 61/352,251, filed on Jun. 7, 2010, provisional application No. 61/361,621, filed on Jul. 6, 2010.

(51) Int. Cl.
*B60R 11/02* (2006.01)
*H04M 1/60* (2006.01)
(Continued)

(52) U.S. Cl.
CPC ....... *H04M 1/6075* (2013.01); *B60R 11/0241* (2013.01); *H04M 1/67* (2013.01); *H04M 1/72577* (2013.01); *H04W 4/027* (2013.01)

(58) Field of Classification Search
USPC .......... 701/1; 702/150, 127, 189; 455/418, 455/422.1, 345, 39, 456.1, 556.2, 575.9,
(Continued)

(56) References Cited

U.S. PATENT DOCUMENTS 5,299,132 A * 3/1994 Wortham ............. 455/457
5,884,221 A * 3/1999 Wortham ............. 701/300
(Continued)

FOREIGN PATENT DOCUMENTS

WO    2011016886 A1    2/2011

OTHER PUBLICATIONS

Initial Analysis of SAR From a Cell Phone Inside a Vehicle by Numerical Computation; Anzaldi, G. ; Silva, F. ; Fernandez, M. ; Quilez, M. ; Riu, P.J.; Biomedical Engineering, IEEE Transactions on; vol. 54 , Issue: 5; Digital Object Identifier: 10.1109/TBME.2006.889776; Publication Year: 2007 , pp. 921-930.*
(Continued)

*Primary Examiner* — Cuong H Nguyen
(74) *Attorney, Agent, or Firm* — Brooks Kushman P.C.; Jennifer M. Stec

(57) ABSTRACT

In at least one embodiment, a system for locating a personal communication device (PCD) in a vehicle is provided. The system includes a controller that is configured to receive a first signal indicative of a location of at least one PCD in a vehicle and to determine whether the at least one PCD is located within one of a driver zone and a passenger zone. The driver zone corresponds to a location in the vehicle generally occupied by a driver and the passenger zone corresponds to a location in the vehicle generally occupied by at least one passenger. The controller is further configured to receive a second signal indicative of at least one occupant being positioned in at least one of the driver zone and the passenger zone and to store data corresponding to a modified driver zone that includes the driver zone and at least a portion of the passenger zone in response to determining that the at least one PCD is located in the driver zone and the second signal indicating that a first occupant is in the
(Continued)

driver zone and a second occupant is not detected within the passenger zone.

20 Claims, 6 Drawing Sheets

(51) Int. Cl.
*H04M 1/67* (2006.01)
*H04M 1/725* (2006.01)
*H04W 4/02* (2009.01)

(58) Field of Classification Search
USPC ....... 455/68, 41.2, 419, 550.1, 414.1, 404.2, 455/456.4; 348/148, E7.08; 340/993
IPC ................ H04M 1/6075,1/67, 1/72577; H04W 4/027
See application file for complete search history.

(56) References Cited

U.S. PATENT DOCUMENTS

| | | |
|---|---|---|
| 6,690,956 B2 | 2/2004 | Chua et al. |
| 6,973,333 B1* | 12/2005 | O'Neil ............. H04W 4/046 340/425.5 |
| 7,181,229 B2* | 2/2007 | Singh et al. ............ 455/456.4 |
| 7,343,148 B1* | 3/2008 | O'Neil ............. H04W 4/046 340/539.13 |
| 7,471,929 B2 | 12/2008 | Fujioka et al. |
| 7,474,264 B2 | 1/2009 | Bolduc et al. |
| 7,957,773 B2 | 6/2011 | Chua et al. |
| 8,131,205 B2 | 3/2012 | Rosen |
| 8,200,291 B2* | 6/2012 | Steinmetz et al. ......... 455/569.2 |
| 8,270,933 B2* | 9/2012 | Riemer ............. H04M 1/72577 455/345 |
| 8,280,791 B2* | 10/2012 | Davis et al. ................ 705/34 |
| 8,606,253 B2* | 12/2013 | Ahn ............. H04M 1/72577 455/1 |
| 8,688,180 B2* | 4/2014 | Catten ................ 455/575.9 |
| 8,892,391 B2* | 11/2014 | Tu ................ G01D 1/16 702/127 |
| 2002/0107032 A1 | 8/2002 | Agness et al. |
| 2004/0203667 A1* | 10/2004 | Schroeder ............. H04W 48/04 455/414.1 |
| 2004/0233070 A1* | 11/2004 | Finnern ................ 340/995.13 |
| 2007/0120948 A1 | 5/2007 | Fujioka et al. |
| 2007/0124043 A1 | 5/2007 | Ayoub et al. |
| 2008/0133705 A1* | 6/2008 | Lemond et al. ............. 709/217 |
| 2009/0029675 A1* | 1/2009 | Steinmetz et al. ........... 455/410 |
| 2009/0111422 A1 | 4/2009 | Bremer et al. |
| 2009/0280858 A1* | 11/2009 | Ahn ............. H04M 1/72577 455/550.1 |
| 2009/0312901 A1 | 12/2009 | Miller et al. |
| 2010/0035632 A1 | 2/2010 | Catten |
| 2010/0148920 A1 | 6/2010 | Philmon et al. |
| 2010/0227629 A1 | 9/2010 | Cook et al. |
| 2010/0299001 A1* | 11/2010 | Suzuki ................ 701/2 |
| 2011/0021234 A1* | 1/2011 | Tibbitts ............. H04W 48/04 455/517 |
| 2011/0039581 A1 | 2/2011 | Cai et al. |
| 2011/0077032 A1 | 3/2011 | Correale et al. |
| 2011/0105082 A1* | 5/2011 | Haley ............. H04M 1/72577 455/411 |
| 2011/0257973 A1 | 10/2011 | Chutorash et al. |
| 2011/0294520 A1* | 12/2011 | Zhou et al. ............. 455/456.1 |
| 2011/0298924 A1* | 12/2011 | Miller et al. ............ 348/148 |
| 2011/0300843 A1* | 12/2011 | Miller et al. ............ 455/418 |
| 2011/0301780 A1* | 12/2011 | Miller et al. ............ 701/1 |
| 2012/0310587 A1* | 12/2012 | Tu ................ G01D 1/16 702/141 |

OTHER PUBLICATIONS

Will Mobile Computing's Future Be Location, Location, Location?; Vaughan-Nichols, S.J.; Computer; vol. 42 , Issue: 2 Digital Object Identifier: 10.1109/MC.2009.65; Publication Year: 2009 , pp. 14-17.*
Tests of smartphone localization accuracy using W3C API and Cell-Id; Sabak, G.; Computer Science and Information Systems (FedCSIS), 2013 Federated Conference on; Publication Year: 2013 , pp. 845-849; IEEE Conference Publications.*
Yan Wang et al., Stevens Institute of Technology, Hoboken, NJ 07030, USA, ywang48@stevens.edu; Sensing Vehicle Dynamics for Determining Driver Phone Use, MobiSys'13, Jun. 25-28, 2013, Taipei, Taiwan; Copyright 2013 ACM 978-1-4503-1672-9/13/06.*
Detecting Driver Phone Use Leveraging Car Speakers—Sigmobile; www.sigmobile.org/awards/mobicom2011; J Yang et al., Stevens Institute of Technology, Hoboken, NJ 07030, USA—2011; MobiCom'11, Sep. 19-23, 2011, Las Vegas, Nevada, USA.Copyright 2011 ACM 978-1-4503-0492-4/11/09.*
Detecting Driver Phone Use Leveraging Car Speakers; mobilityfirst.winlab.rutgers.edu/documents/JYang.pdf Rutgers University; by J Yang et al.; pubished 2011 ; pp. 1-12.*
Inertial Analysis of SAR From a Cell Phone Inside a Vehicle by Numerical Computation, by Gabriel Anzaldi et al., IEEE Trans. of Biomedical Engineering, vol. 54, No. 5, May 2007, pp. 921-930.*
Sensing Vehicle Dynamics for Determining Driver Phone Use; by Yan Wang et al., MobiSys'13, Jun. 25-28, 2013, Taipei, Taiwan Copyright 2013 ACM 978-1-4503-1672-9/13/06, pp. 1-14.*
In-vehicle cell phones: smoke, but where's the fire?; Curry, D.G.; Spectrum, IEEE; vol. 38 , Issue: 8 DOI: 10.1109/6.938721; Publication Year: 2001 , pp. 16-18; IEEE Journals & Magazines.*
Autonomous detection of distracted driving by cell phone; Watkins, M.L. ; Amaya, I.A. ; Keller, P.E. ; Hughes, M.A. ; Beck, E.D. Intelligent Transportation Systems (ITSC), 2011 14th International IEEE Conference on; DOI: 10.1109/ITSC.2011.6083026 Publication Year: 2011 , pp. 1960-1965.*
An analysis, design and precautionary measure for mobile phone accidents while driving and cost-effective fatalities Shabeer, H.A. ; Banu, R.S.D.W.;Wireless Communication, Vehicular Technology, Information Theory and Aerospace & Electronic Systems Technology (Wireless VITAE), 2011 2nd International Conference on; DOI: 10.1109/WIRELESSVITAE.2011.*
Enhancing in-vehicle safety via contact sensor for stress detection; Patil, S.A. ; Hansen, J.H.L;Vehicular Electronics and Safety (ICVES), 2009 IEEE International Conference on; DOI: 10.1109/ICVES.2009.5400227; Publication Year: 2009 , pp. 86-90.*
Assessment of distractions inferred by in-vehicle information systems on a naturalistic simulator; N. Hernández; P. Jiménez; L. M. Bergasa; I. Parra; I. García; M. Ocaña; B. Delgado; M. Sevillano; Intelligent Transportation Systems (ITSC), 2011 14th International IEEE Conference on; Year: 2011; pp. 1279-1284, DOI: 10.1109/ITSC.2011.6082886.*
Systems Engineering of Datacasting for Public Safety Vehicles; S. A. Valcourt; K. Chamberlin; B. McMahon; A. Kun; Technologies for Homeland Security, 2007 IEEE Conference on; Year: 2007; pp. 45-50, DOI: 10.1109/THS.2007.370018.*
An Argument Against "No-Look Texting" While Driving; Robert Rosenberger; IEEE Technology and Society Magazine; Year: 2013, vol. 32, Issue: 1; pp. 53-59, DOI: 10.1109/MTS.2013.2241474.*
In-vehicle cell phones: smoke, but where's the fire?; D. G. Curry; IEEE Spectrum; Year: 2001, vol. 38, Issue: 8; pp. 16-18, DOI: 10.1109/6.938721.*
Cell Phone Use While Driving: Risk Implications for Organizations; S. Yang; R. Parry; IEEE Technology and Society Magazine Year: 2014, vol. 33, Issue: 4; pp. 65-72, DOI: 10.1109/MTS.2014.2363984.*

* cited by examiner

SYSTEM AND METHOD FOR MONITORING THE LOCATION OF A COMMUNICATION DEVICE IN A VEHICLE

CROSS-REFERENCE TO RELATED APPLICATIONS

This application claims the benefit of U.S. provisional application Ser. Nos. 61/352,251 filed on Jun. 7, 2010 and 61/361,621 filed on Jul. 6, 2010, which are hereby incorporated by reference in their entirety.

TECHNICAL FIELD

Embodiments disclosed herein generally relate to a system and method for monitoring the location of a communication device in a vehicle.

BACKGROUND

It is known to restrict cell phone usage for a driver in a vehicle. One example of such an implementation is disclosed in co-pending International Application Number: PCT/US2010/034030 ("the '030 publication") to Miller et al., filed on May 5, 2010. Another example of such an implementation is disclosed in U.S. Patent Publication No. 2011/0021234 ("the '234 publication") to Tibbets et al. The '234 publication discloses a method and system for detecting, monitoring and/or controlling one or more of mobile services for a mobile communication device. The method and system of the '234 publication determines whether the vehicle is being operated by a user that may also have access to a mobile communication device which, if used concurrently while the vehicle is in operation, may lead to unsafe operation of the vehicle. If the mobile services control system determines that a vehicle operator has potentially unsafe access to a mobile communication device, the mobile services control system may restrict operator access to one or more services that would otherwise be available to the operator via the mobile communication device.

SUMMARY

In at least one embodiment, a system for locating a personal communication device (PCD) in a vehicle is provided. The system includes a controller that is configured to receive a first signal indicative of a location of at least one PCD in a vehicle and to determine whether the at least one PCD is located within one of a driver zone and a passenger zone. The driver zone corresponds to a location in the vehicle generally occupied by a driver and the passenger zone corresponds to a location in the vehicle generally occupied by at least one passenger. The controller is further configured to receive a second signal indicative of at least one occupant being positioned in at least one of the driver zone and the passenger zone and to store data corresponding to a modified driver zone that includes the driver zone and at least a portion of the passenger zone in response to determining that the at least one PCD is located in the driver zone and the second signal indicating that a first occupant is in the driver zone and a second occupant is not detected within the passenger zone.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Restricting cell phone usage in a vehicle for a driver while driving his/her respective vehicle is known. While it may be desirable to restrict driver cell phone usage (e.g., prevent the driver from actuating switches positioned on the cell phone or completely disable operation of the cell phone altogether) while the vehicle is being driven, it is recognized that an implementation may consider cell phone usage for other passengers (i.e., non-drivers) in the vehicle. In order to control cell phone usage in a vehicle, it may be necessary to locate a driver's zone in the vehicle and a passenger's zone in the vehicle such that cell phone operation in the driver's zone may be restricted when appropriate and cell phone operation in the passenger's zone is enabled.

The embodiments set forth herein generally illustrate and describe a plurality of controllers, modules, and/or devices (or electrically based components). All references to the various electrically based components and the functionality provided for each, are not intended to be limited to encompassing only what is illustrated and described herein. While particular labels may be assigned to the various electrically based components disclosed, such labels are not intended to limit the scope of the operation thereof. The electrically based components may be combined with each other and/or separated in any manner based on the particular type of electrical architecture that is desired or intended to be implemented in the vehicle. The electrically based components may be combined with each other and/or separated in any manner based on the particular type of electrical architecture that is desired in the vehicle. It is generally recognized that each electrically based component disclosed herein may include, but not limited to, any number of microprocessors, ICs, discrete analog devices, memory devices (e.g., FLASH, RAM, ROM, EPROM, EEPROM, or other suitable variants thereof), and software which co-act with one another to perform the various functions set forth below.

Figure 1:
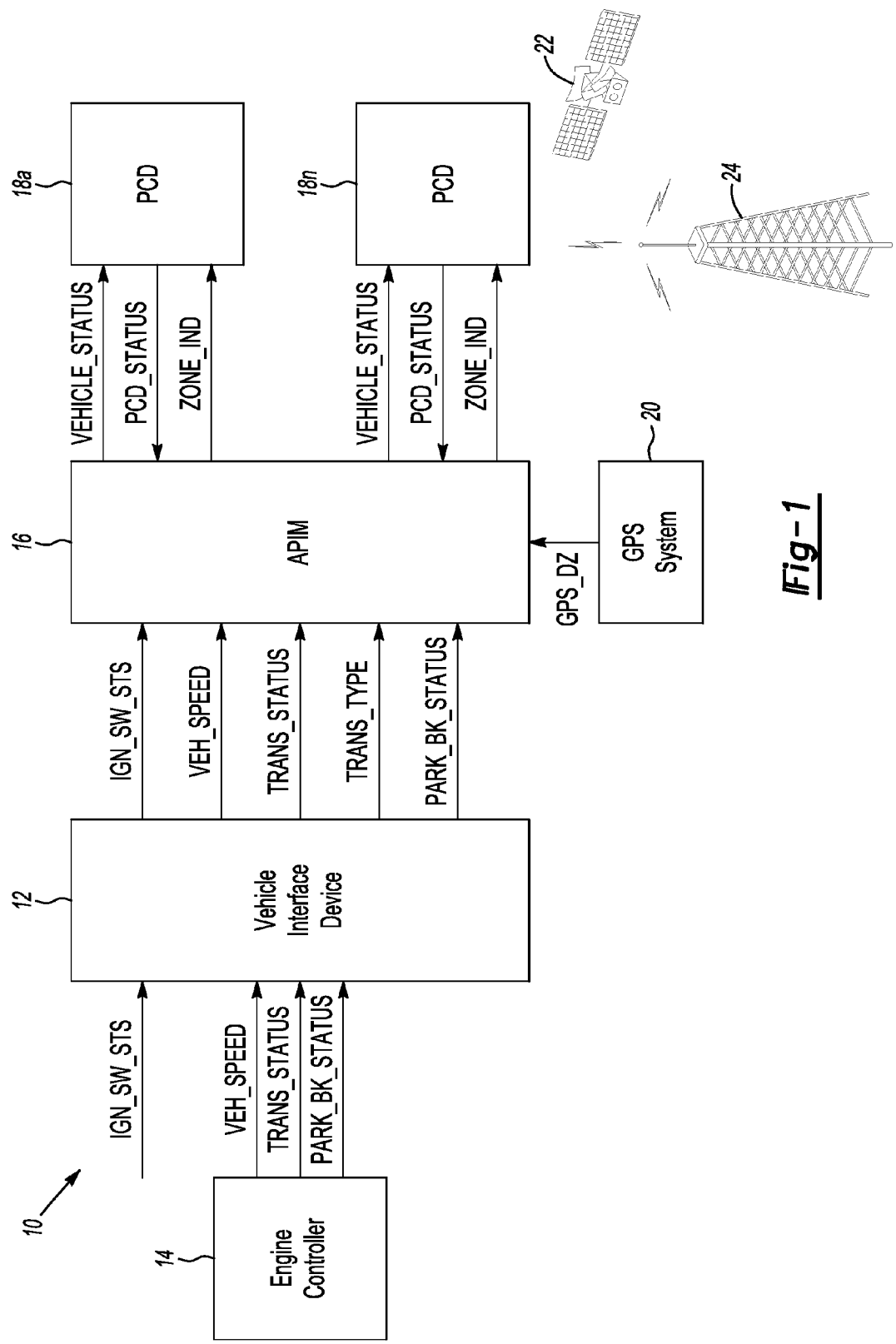
FIG. 1 depicts a system for monitoring the location of a personal communication device (PCD) in accordance to one embodiment.

FIG. 1 depicts a system 10 for monitoring the location of a personal communication device (PCD) in accordance to one embodiment. The system 10 includes a vehicle interface device 12, an engine controller 14, and an auxiliary protocol interface module (APIM) (or controller) 16. The vehicle interface device 12 may be implemented as a interface device which provides information related to various states of vehicle functionality to the driver. For example, the device 12 may be implemented as a display and/or audible mechanism that provides status or warning messages to the driver and/or as a switch device (e.g., touch screen, voice input, or other suitable device) that enables the driver to select various vehicle functions.

The device 12, the engine controller 14, and the controller 16 may transmit signal to/from one another via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys (not shown). The device 12 may receive a signal IGN_SW_STS from a body controller (not shown) to determine the position of the ignition switch. The engine controller 14 transmits a signal VEH_SPD to device 12. The signal VEH_SPD corresponds to the speed of the vehicle. The engine controller 14 also transmits a signal TRANS_STATUS and a signal PARK_BK_STATUS to the device 12. The signal TRANS_STATUS corresponds to whether the transmission is in a PARK (P), Reverse (R), Neutral (N), Drive (D), or Low (L) state. The signal PARK_BK_STATUS corresponds to whether an emergency park brake is engaged. The signal PARK_BK_STATUS may be of interest in the event the vehicle is equipped with a manual transmission. For example, if the signal PARK_BK_STATUS indicates that the park brake is engaged, such a condition would correspond to the vehicle being in a parked state. It may not be possible for a manual transmission to provide transmission status. This aspect will be discussed in more detail below.

The device 12 may transmit the signals IGN_SW_STS, VEH_SPD, TRANS_STATUS, and PARK_BK_STATUS to the controller 16. The device 12 may also transmit a signal TRANS_TYPE which corresponds to the type of transmission that is equipped in the vehicle. For example, the vehicle may include an automatic transmission or a manual transmission. It is recognized that all of the signals noted above may be transmitted directly to the controller 16 from the engine controller 14.

The controller 16 may be wirelessly coupled to any number of portable communication devices (PCDs) 18a-18n ("18") via a Bluetooth protocol or other suitable interface. Each PCD 18 may be a cell phone. The controller 16 is part of an in-vehicle communication system (and includes at least one transmitter (not shown) and at least one receiver (not shown)) which interfaces with each PCD 18 to enable voice input control to perform a function with the PCD 18 so that the driver does not have to enter data directly into the PCD 18. The controller 16 may interface via switches (not shown) positioned within the vehicle to enable touch selection control to perform a function with the PCD 18 so that the driver does not have to enter data directly into the PCD 18. In one example, the controller 16 may be implemented as part of the SYNC system developed by Ford Motor Company ® and Microsoft ®. Switches may be positioned on the controller 16, the vehicle's steering wheel (not shown), the ECM 44, or on the device 12 to enable touch input.

A global positioning satellite (GPS) system 20 is operably coupled to the controller 16 via the data communication bus. In the general, the GPS system 20 may provide information related to the location of the vehicle. The location of the vehicle may correspond to coordinate data such as the longitude and latitude of the vehicle while driven. In general, a plurality of satellites 22 and/or a plurality of ground stations 24 communicate with the GPS system 20 to establish the location of the vehicle. For example, the GPS system 20 is capable of establishing the vehicle's position and velocity relative to the earth's position and velocity relative to the earth's surface by processing data received from the plurality of satellites 22 and/or ground stations 24.

As the vehicle moves latitudinally and/or longitudinally across the earth's surface, the GPS system 20 is capable of presenting the position of the vehicle with reference coordinates that correspond to, among other things, the latitude and longitude on the earth's surface. The GPS system 20 may also be configured to provide a GPS coordinate that correspond to a driver zone 26 (see FIG. 2) in the vehicle. For example, the GPS system 20 may be configured to provide a GPS coordinate (or a range of GPS coordinates) on a signal GPS_DZ that corresponds to a zone, which is where a driver of the vehicle may be seated while driving the vehicle. It is recognized that a GPS chip 27 (see FIG. 2) may be located on a driver's seat to provide the GPS coordinate for the driver's zone or that the GPS system 20 may provide such a signal.

Figure 2:
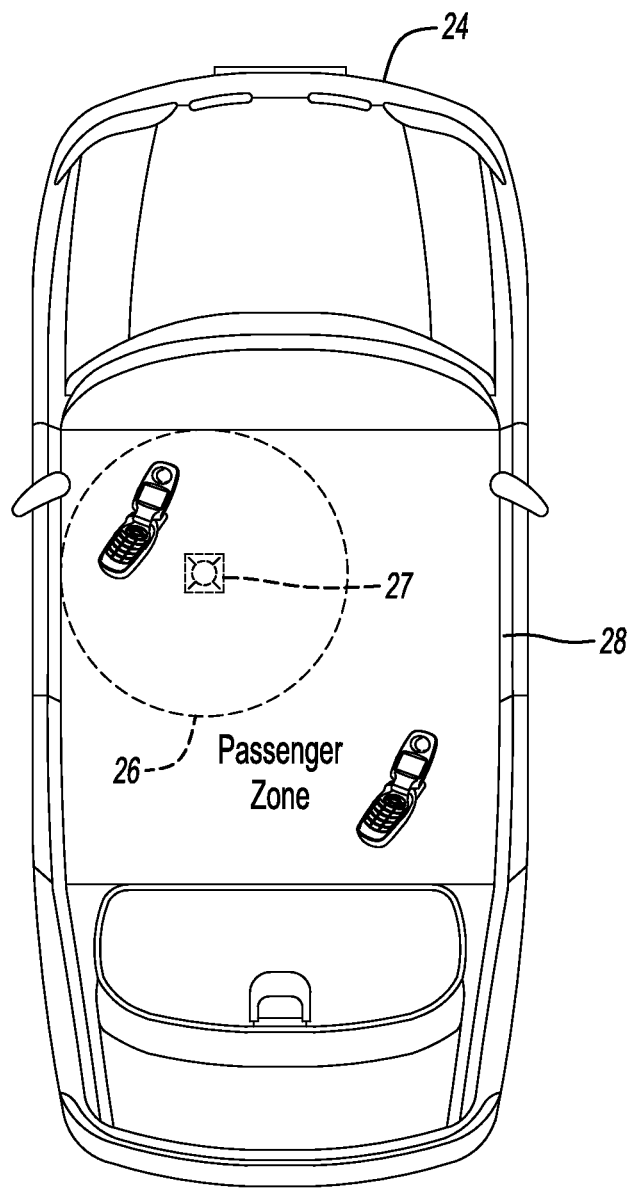
FIG. 2 depicts a driver zone and a passenger zone in a vehicle in accordance to one embodiment.

As noted above, one or more PCDs 18 may be operably coupled to the controller 16 via a Bluetooth protocol. Each PCD 18 may transmit a signal PCD_STATUS that may include a device name for itself in addition to a GPS location for each PCD 18 while in the vehicle. Each PCD 18 obtains its GPS coordinates via a GPS chip that is integrated therein and a network. The device name that is transmitted for each PCD 18 generally provides an ID for that particular PCD 18. The device name and GPS location for each PCD 18 is used by the controller 16 to determine the identity of a particular phone and its corresponding location (e.g., whether the PCD 18 is located in a driver zone 26 or in the passenger zone 28 (see FIG. 2)). FIG. 2 depicts the driver zone 26 and the passenger zone 28 in a vehicle 24. The controller 16 compares the GPS coordinates for each PCD 18 as received on the signal PCD_STATUS and compares to the GPS coordinates (or range of coordinates) as provided by the signal GPS_DZ to determine which of the PCDs 18 are located in the driver zone 26. The controller 16 may also transmit a signal ZONE_ID to the PCD 18 to indicate that such a PCD 18 is detected to be in the driver's zone 26. The controller 16 may also transmit a signal VEHICLE_STATUS that corresponds to whether the driver is "active" (e.g., vehicle is moving where vehicle speed is above predetermined threshold) or "inactive" (e.g., vehicle is parked or vehicle speed is below predetermined threshold) to the PCD 18 that is detected to be in the driver zone 26. The controller 16 monitors the signals IGN_SW_STS, VEH_SPEED, TRANS_SPEED, TRANS_TYPE and/or PARK_BK_STATUS to determine whether the driver is active or inactive. In the event the PCD 18 receives the signal VEHICLE_STATUS indicating the driver is considered "active" and the signal ZONE_IND indicating that the PCD 18 is in the driver zone 26, then the PCD 18 may disable its operation or only allow itself to operate via voice recognition in conjunction with the controller 16.

Figure 3:
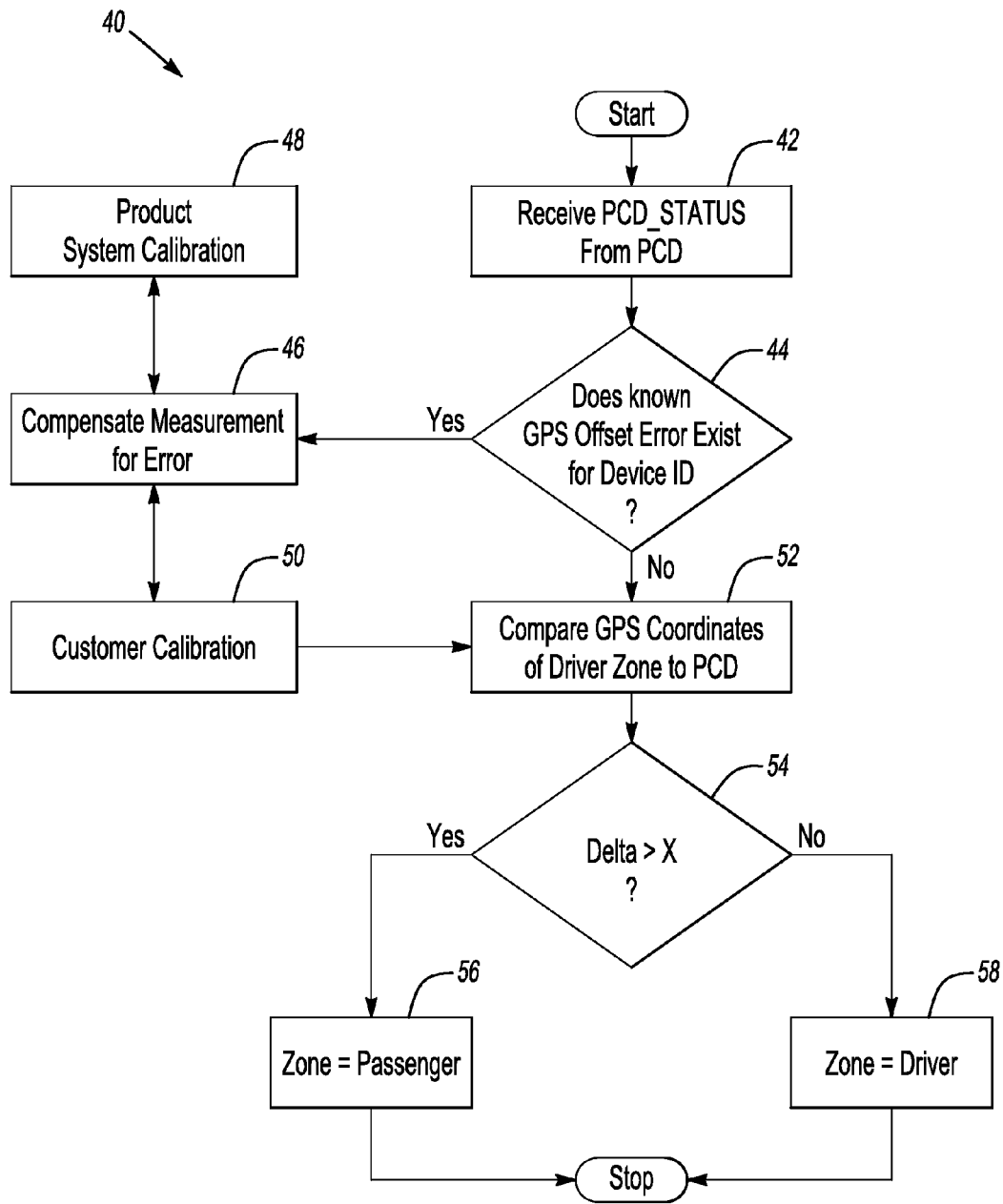
FIG. 3 depicts a method for determining whether the PCD is located in a driver zone or a passenger zone in accordance to one embodiment.

FIG. 3 depicts a method 40 for determining whether the PCD 18 is located in a driver zone 26 and a passenger zone 28 in accordance to one embodiment. The particular order of the operations in the method 40, when executed, can be in any order and are not to be limited to only being performed sequentially. The order of the operations may be modified or varied based on the desired criteria of a particular implementation.

In operation 42, the controller 16 receives the signal PCD_STATUS including the device name and GPS location from any one or more of the PCDs 18 that are detected in the vehicle.

It is recognized that operations 44, 46, 48 and 50 may be optionally implemented and are set forth in the event such operations are deemed necessary to account for system variation (e.g., PCD-GPS measurement, vehicle GPS measurement, package location, etc.)

In operation 44, the controller 16 may determine if the system 10 has been calibrated to account for system variance.

In operations 46, 48 and 50, the controller 16 may receive offset GPS information (by way of a customer initiated learn procedure or product validation (test results/system calibration). For example, if the driver of the vehicle is sitting within the driver seat (or driver's zone) and the vehicle is detected to be in an active state, and the PCD 18 usage is not being restricted, such a condition may be indicative that the system requires calibration. GPS coordinates provided by the PCD 18 are offset. The factory, customer, or service technician may calibrate the system 10 by initiating a calibration mode whereby the user may record GPS coordinates in a region that is generally situated about the driver zone 26. For example, the driver may record multiple GPS locations which in effect may define the driver zone 26. After calibration, the PCD 18 may transmit GPS coordinates that correspond to the stored GPS coordinates once such PCD 18 is in the customer defined driver zone 26.

The controller 16 may be configured to store or learn modified GPS coordinates by way of a customer learn procedure to compensate for the offset attributed to the PCD 18. For example, the driver while seated in the driver seat may control (or calibrate) his/her PCD 18 such that the GPS coordinates that are output by the PCD 18 are modified.

In operation 52, the controller 16 compares the GPS coordinates of the driver zone 26 to the GPS coordinates of the PCD(s) 18 to determine which PCD 18 is located within the driver zone 26. The controller 16 is able to correlate the device name with a particular GPS coordinate for a given PCD 18 (for each PCD 18 detected to be in the vehicle) via the signal PCD_STATUS so that when the PCD 18 is determined to be located in the driver zone 26, the controller 16 has knowledge of which PCD 18 is in the driver zone 26. If new GPS coordinates of the PCD 18 has been established by the customer or by way of product system calibration (see operations 48-50), then the controller 16 may store such new GPS coordinates for comparison to the GPS coordinates of the driver zone 26.

In operation 54, the controller 16 compares the particular GPS coordinate received for the PCD 18 to the GPS coordinate (or range of GPS coordinates) as provided by the integrated GPS chip 27 or by the GPS system 20 for the driver zone 26. In one example, the GPS coordinate (or range of GPS coordinates) which form the driver zone 26 may correspond to a diameter of 3 ft that is centered at the driver's seat. It is recognized that the diameter (or size) of the driver zone 26 may vary based on the desired criteria of a particular implementation. If the GPS coordinate for the PCD 18 is not similar to the GPS coordinate or does not fall within the range of GPS coordinates for the driver zone 26, then the method 40 moves to operation 56. If the above condition is true, then the method 40 moves to operation 58.

In operation 56, the controller 16 may store in memory the device name(s) for the PCDs 18 that were detected be within the passenger zone 28. The controller 16 may transmit the signal ZONE_IND to each applicable PCD 18 indicating that it is in the passenger zone 28.

In operation 58, the controller 16 may store in memory the device name for the PCD 18 that is detected to be in the driver zone 26. The controller 16 may transmit the signal ZONE_IND to the applicable PCD 18 indicating that it is in the driver zone 26. It is recognized that the method 40 may be executed many times over to accommodate for the driver and the passenger switching locations with one another or for the driver trading phones with the passenger in an attempt to use the passenger's PCD 18 while in the driver zone 26.

Figure 4:
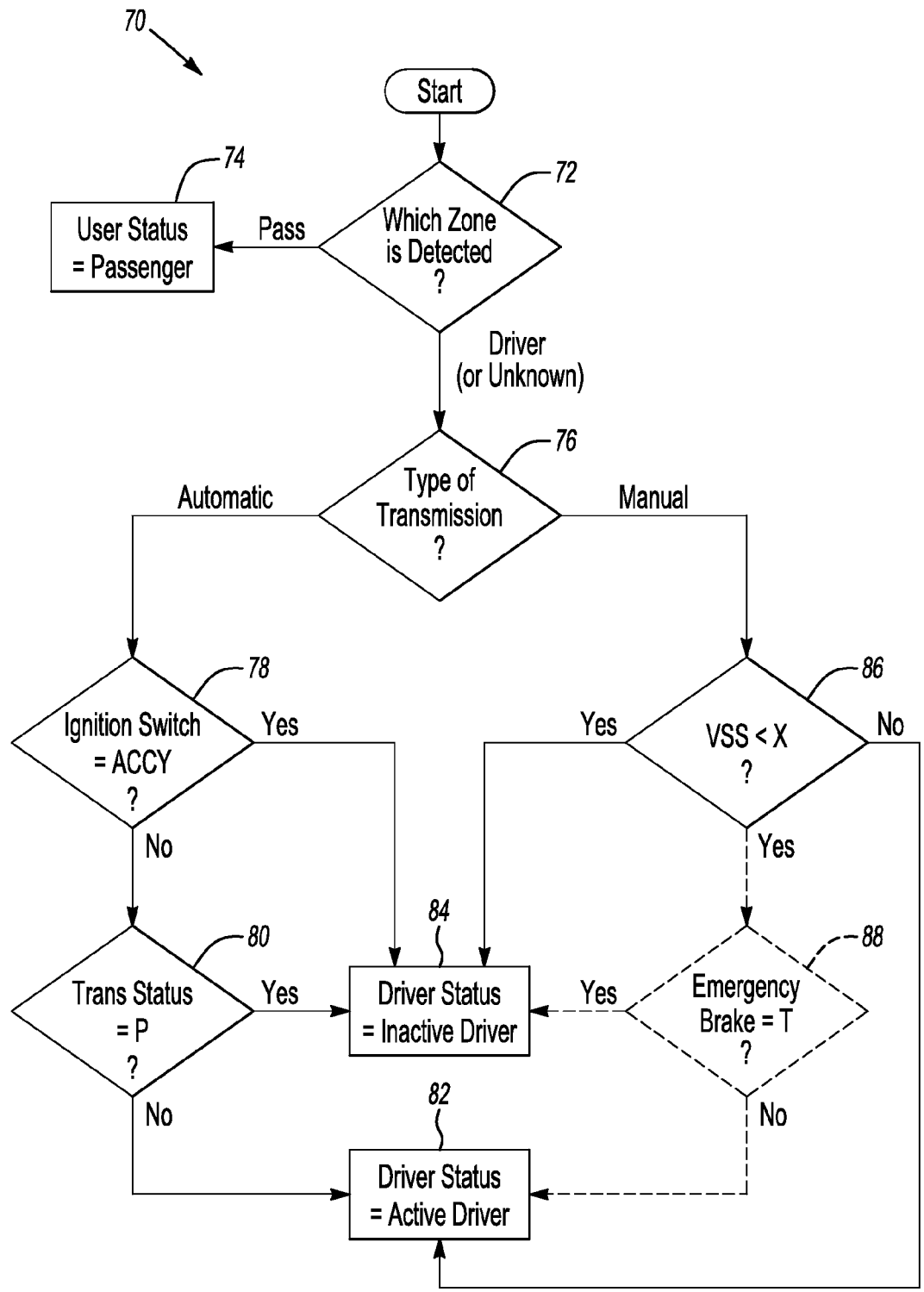
FIG. 4 depicts a method for determining whether the driver is in one of an active state or an inactive state so that the PCD is capable of being controlled based on the state in accordance to one embodiment.

FIG. 4 depicts a method 70 for determining whether the driver is in one of an active state or an inactive state so that the PCD 18 is capable of being controlled based on the state in accordance to one embodiment. The particular order of the operations in the method 80 when executed can be in any order and are not to be limited to only being performed sequentially. The order of the operations may be modified or varied based on the desired criteria of a particular implementation.

In operation 72, the controller 16 determines which zone each PCD 18 is in (e.g., the method 40 is executed as noted above). Presumably, if there are more than two PCDs 18 in the vehicle, one will be in the passenger zone 28 and the other in the driver zone 26. For the PCD(s) 18 detected to be in the passenger zone 28, the method moves to operation 74. For the PCD 18 detected to be in the driver zone 26, the method 70 moves to operation 76.

In operation 74, the controller 16 transmits the signal ZONE_IND to the PCD(s) 18 indicating that such a PCD(s) 18 is identified as being in the passenger zone 28. At this point, the PCD 18 will not impose restrictions on itself since it is detected to be in the passenger zone 28.

In operation 76, the controller 16 determines the transmission type for the vehicle based on the signal TRANS_TYPE. As noted above, the signal TRANS_TYPE indicates whether the vehicle includes an automatic or manual transmission. If the vehicle includes an automatic transmission, then the method 70 moves to operation 78. If the vehicle includes a manual transmission, then the method 70 moves to operation 86.

In operation 78, the controller 16 determines whether the key in ignition is in the Accessory ("ACCY") state by monitoring the signal IGN_SW_STS. If the key in ignition is not in the ACCY state, then the method 70 moves to operation 80. If so, then the method 70 moves to operation 84. If the vehicle is in the ACCY state, then it is presumed that the vehicle is in a parked state and restrictions on the PCD 18 (even if in the driver zone 26) is not necessary.

In operation 80, the controller 16 determines the transmission status by monitoring the signal TRANS_STATUS. If the signal indicates that that the vehicle is in any state other than PARK, then the method 80 moves to operation 82. If the signal indicates that the vehicle is in PARK, then the method 80 moves to operation 84. It is recognized that vehicle speed may be used in place of transmission status. For example, if the vehicle speed is determined to be greater than a predetermined vehicle speed, PCD 18 restriction may be imposed.

In operation 82, the controller 16 determines that the driver is an active driver (e.g., the vehicle is in a non-stopped state, or may be moving above a predetermined vehicle speed). The active state generally corresponds to a state in which PCD 18 operation may be restricted completely or partially (such as in a hands free mode or voice recognition is allowed). The controller 16 transmits the signal VEHICLE_STATUS indicating that the vehicle is in a non-stopped state (e.g., the driver (or vehicle) is active) to the PCD 18 that is detected to be in the driver zone 26. The PCD 18 may then restrict its operation by disabling operation for the driver when the vehicle is in the non-stopped state or may enable voice control operation such that the driver can only use voice input via the controller 16 (e.g., force on hands free operation) to operate and engage in conversation with another party.

In operation 84, the controller 16 determines that the driver is inactive (e.g., the vehicle is in a stopped state). That is, the driver may be parked or stopped at a light or other location. The inactive state generally corresponds to a state in which full PCD 18 operation may be allowed. In this condition, the controller 16 transmits the signal VEHICLE_STATUS indicating that the vehicle is in a stopped state (e.g., the driver (or vehicle) is inactive) to the PCD 18 that is detected to be in the driver zone 26. The PCD 18 may then allow full operation. Meaning, the driver may be able to directly physically control the PCD 18 via touch entry or may continue to use voice control operation (or hands free operation).

In operation 86, the controller 16 determines whether the vehicle speed as indicated on the signal VEH_SPEED is below a predetermined vehicle speed. If the vehicle speed is below the predetermined vehicle speed, then the method 70 moves to operation 84 and the driver is classified as an inactive driver and full PCD 18 operation can be maintained by the driver if inactive. If the vehicle speed is above the predetermined vehicle speed, then the method 70 may optionally move to operation 82.

In another example, in operation 88, park brake status may be used in place of the vehicle speed for determining whether the driver is active or inactive. For example, the controller 16 determines whether the park brake is engaged by monitoring the signal PARK_BK_STATUS. In this condition, the vehicle is equipped with a manual transmission as noted in connection with operation 76. The controller 16 may monitor park brake status as a mechanism to determine if the vehicle is in a park or non-park state since the controller 16 does not receive an indication of PRNDL status (or transmission status) from an automatic transmission because the vehicle is not equipped with an automatic transmission. If the park brake is engaged, then the method 70 moves to operation 84 where the driver is an inactive driver and full PCD 18 operation may be allowed for the driver. If not, then the method 70 may move directly to operation 82 where the driver is classified as an active driver and the PCD 18 restrictions are imposed.

It is recognized for manual transmission that full PCD 18 operation may be allowed if the vehicle is in PARK and/or when the vehicle is detected to be less than a predetermined speed (e.g., vehicle is stopped at a stop light or for some other reason while not in PARK). In another embodiment, operations 86 and 88 may be combined such that both vehicle speed and park brake status are monitored together to determine if the driver is active or inactive. This may improve resolution in determining whether the driver is active or inactive.

Figure 5:
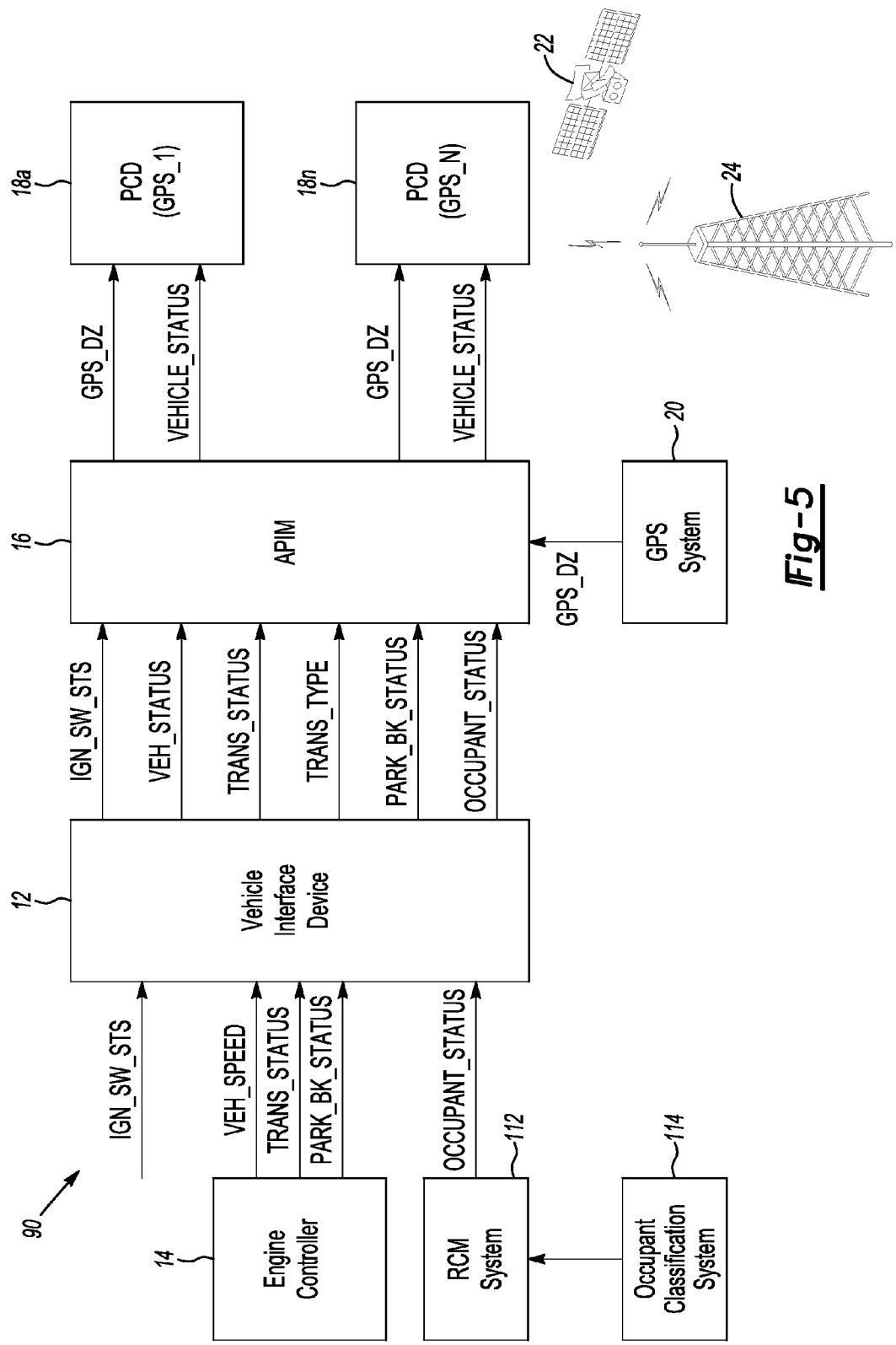
FIG. 5 depicts a system for monitoring the location of the PCD in accordance to another embodiment.

FIG. 5 depicts a system 90 for monitoring the location of the PCD in accordance to another embodiment. The operation of the system 90 is generally similar to that of system 10. However, the determination of whether the PCD 18 is located in the driver zone 26 or in the passenger zone 28 is made by the PCD(s) 18. For example, the controller 16 transmits the signal GPS_DZ to each PCD 18 detected to be in the vehicle. As noted above, the signal GPS_DZ generally corresponds to a GPS coordinate (or a range of coordinates) that is indicative of the driver zone 26.

Each PCD 18 that is detected in the vehicle makes a determination as to whether it is located in the driver zone 26 based on the GPS location specified on the signal GPS_DZ. For example, each PCD 18 receives GPS location information from a network regarding its location via the integrated GPS chip. The PCD 18 uses such information and determines if the GPS coordinate of the PCD 18 itself is similar to the GPS coordinate (or within a range of GPS coordinates) as indicated on the signal GPS_DZ. The PCD 18 may receive the signal VEHICLE_STATUS which indicates whether the driver (or vehicle) is active or inactive. If a particular PCD 18 determines that it is in the driver zone 28 and receives the signal VEHICLE_STATUS indicating that the driver (or vehicle) is active, then the PCD 18 may restrict its functionality by either forcing on a hands free operation or by disabling its operation altogether. If a particular PCD 18 determines that it is in the driver zone 28 and receives the signal VEHICLE_STATUS indicating that the driver (or vehicle) is inactive, then the PCD 18 remains fully operational (e.g., allow touch input control to place call or hands free operation). If a particular PCD 18 determines that it is in the passenger zone 28, then the PCD 18 remains fully operation irrespective of the data on the signal VEHICLE_STATUS.

It is recognized that the signal VEHICLE_STATUS may be transmitted by the controller 16 periodically or event based and that the PCD 18 cyclically monitors it location with respect to the driver zone 26 or passenger zone 28. The implementations set forth above may prevent the driver from switching PCDs 18 with a passenger since the PCD since such implementations are configured to actively monitor the position of each PCD 18 located in the vehicle on a periodic or cyclical basis. So long as the PCD 18 is detected to be in the driver zone 26 (irrespective of whether it is owned by the driver), such PCD may have its functionality restricted if additional vehicle conditions warrant restricting functionality (e.g., whether the vehicle is in active state).

The system 110 is further arranged to include a restraint control module (RCM) 112 and an occupant classification system (OCS) 114 that is operably coupled to the device 12. The OCS 114 generally includes a single position sensor (not shown) positioned in the front passenger seat of the vehicle. The position sensor is configured to transmit a signal to the RCM 112 to indicate whether an occupant is positioned in the front passenger seat of the vehicle.

The RCM 112 receives the signal from the position sensor and transmits a signal OCCUPANT_STATUS to the device 12 (or directly to the controller 16) to indicate whether an occupant is in the front passenger's seat of the vehicle. The system 90 determines that a driver is in the vehicle by monitoring ignition status and/or vehicle speed. For example, in the event the key is in the ignition and in any position other than OFF or vehicle speed is detected; such conditions indicate that the driver is in the vehicle. Accordingly, by monitoring these conditions and the use of a single position sensor in the front passenger seat to determine occupant status (i.e., driver and/or front passenger in vehicle) a more efficient and less expensive occupant detection system may be employed. In the event only the driver is detected to be in the vehicle, the controller 16 may increase the size of the driver zone 26 such that it encompasses not only the area where a driver may be generally situated in the vehicle but to also include at least the front passenger area in the passenger zone 28 to prevent the driver from leaning over into the passenger seat in an attempt to use the PCD 18 in a non-restricted manner. It is recognized that the system 10 may be adapted to include the RCM 112 and OCS 114 and to increase the size of the driver zone 26 to include at least the front passenger are in the passenger zone 28.

Figure 6A:
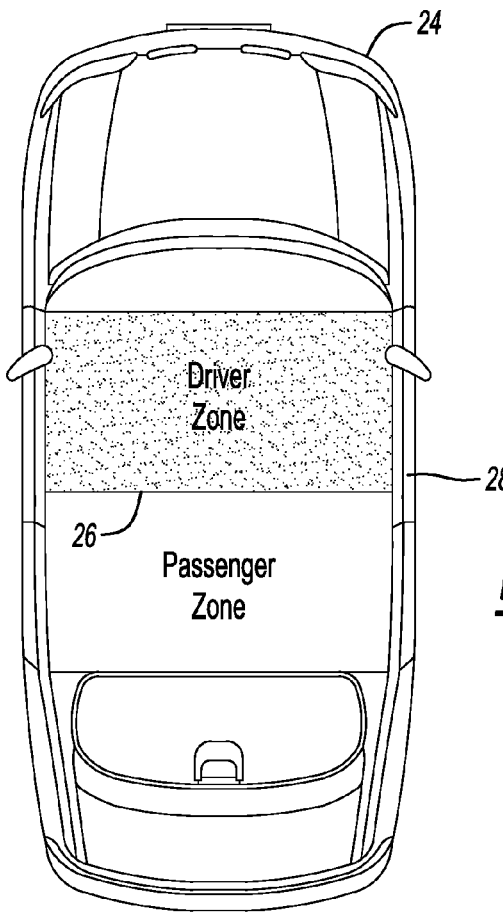
FIG. 6A-6B depict various driver zones and passenger zones as used in connection with an occupant classification system in accordance to one embodiment.

FIG. 6A depicts the increase in the driver zone 28 in the event the controller 16 determines that only the driver is in the vehicle. As depicted, the driver zone 26 is extended (or modified) to protrude onto the front passenger seat of the passenger zone 28. In another example, the entire interior section of the vehicle can be characterized as a driver zone 26 in the event only the driver is detected to be in the vehicle. In this case, so long as the driver is active as noted in connection with FIG. 4, the PCD 18 may restrict PCD 18 operation for the driver irrespective of the location of the PCD 18 in the vehicle. By extending the driver zone to include at least a portion of the passenger zone or to include the entire passenger zone in the event a front passenger is not within the vehicle, the controller 16 cannot be tricked into determining that the PCD 18 is now in the passenger zone 28 if the driver leans over into the passenger zone because the controller 16 knows that only the driver is in the vehicle.

Figure 6B:
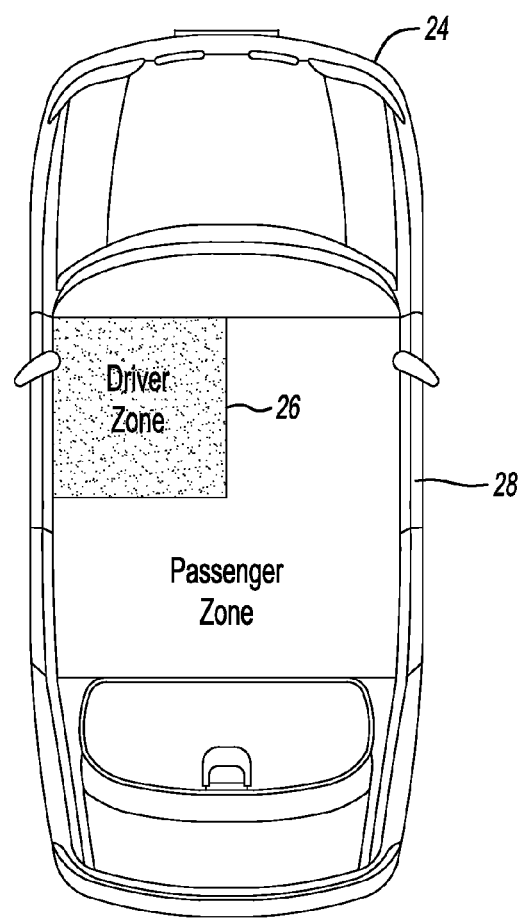

The driver zone 26 when extended to include at least a portion of the passenger zone may be generally defined as a modified driver zone. In this case, the controller 16 may increase the range of GPS coordinates by a predetermined amount, which forms the driver zone 26 as originally provided by the integrated GPS chip 27 or by the GPS system 20. The predetermined amount is generally the amount that includes at least a portion of the passenger zone 28. In connection with the system 10, the controller 16 may compare the GPS coordinates received from the PCD 18 to GPS coordinates that form the modified driver zone. In connection with the system 90, the controller 16 may transmit the GPS coordinates (over the signal GPS_DZ), which form the modified driver zone to the PCD 18 such that the PCD 18 compares its GPS coordinates to the GPS coordinates of the modified driver zone. FIG. 6B depicts the driver zone 26 being in a normal state in the event the driver is in the vehicle and the front passenger is determined to be in the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for locating a personal communication device (PCD) in an automobile, the apparatus comprising:
   a receiver; and
   a controller including the receiver and being configured to:
   receive a first signal indicating that at least one PCD for a first occupant is positioned in a driver zone that corresponds to a location in the automobile generally occupied by a driver;
   receive a second signal indicating that a second occupant is not positioned in a passenger zone, wherein the passenger zone corresponds to a location in the automobile generally occupied by a passenger;
   receive a third signal indicating that the at least one PCD for the first occupant is positioned in the passenger zone after receiving the first signal; and
   store data corresponding to a modified driver zone that includes the driver zone and at least a portion of the passenger zone in response to receiving the second signal and the third signal.

2. The apparatus of claim 1 wherein the controller is further configured to determine transmission status for the automobile.

3. The apparatus of claim 2 wherein the controller is further configured to transmit a vehicle status signal to the at least one PCD for restricting usage thereof in the modified driver zone in response to the transmission status indicating that the automobile is in a non-PARK condition.

4. The apparatus of claim 1 wherein the controller is further configured to determine one of a vehicle speed and a park brake status of the automobile.

5. The apparatus of claim 4 wherein the controller is further configured to transmit a vehicle status signal to the at least one PCD for restricting usage thereof in the modified driver zone in response to one of the vehicle speed being greater than a predetermined vehicle threshold and the park brake status indicating that the park brake is disengaged.

6. The apparatus of claim 1 wherein the controller is further configured to receive the second signal from an occupant classification system including a control module and an occupant sensor.

7. The apparatus of claim 1 wherein the first signal includes at least one global positioning system (GPS) coordinate which identifies the location of the PCD in the automobile and the data corresponds to at least one stored GPS coordinate for the modified driver zone.

8. The apparatus of claim 7 wherein the controller is further configured to compare the at least one GPS coordinate of the first signal to the at least one stored GPS coordinate to determine if the at least one PCD is in the modified driver zone.

9. A method for locating a personal communication device (PCD) in an automobile, the method comprising:
   receiving, via a controller, a first signal indicating that at least one PCD for a first occupant is positioned in a driver zone that corresponds to a location in the automobile generally occupied by a driver;
   receiving a second signal indicating that a second occupant is not positioned in a passenger zone, wherein the passenger zone corresponds to a location in the automobile generally occupied by a passenger;
   receiving a third signal indicating that the at least one PCD for the first occupant is positioned in the passenger zone after receiving the first signal; and
   electronically increasing the driver zone, via the controller, to form a modified driver zone that includes the driver zone and at least a portion of the passenger zone in response to receiving the second signal and the third signal.

10. The method of claim 9 further comprising determining a transmission status for the automobile.

11. The method of claim 10 further comprising transmitting a vehicle status signal to the at least one PCD for restricting usage thereof in the modified driver zone in response to the transmission status indicating that the automobile is in a non-PARK condition.

12. The method of claim 9 further comprising determining one of a vehicle speed and a park brake status of the automobile.

13. The method of claim 12 further comprising transmitting a vehicle status signal to the at least one PCD for restricting usage thereof in response to the at least one PCD being in the modified driver zone and one of the vehicle speed being greater than a predetermined vehicle threshold and the park brake status indicating that the park brake is disengaged.

14. The method of claim 9 further comprising receiving the second signal from an occupant sensor to indicate that the second occupant is not positioned in the passenger zone.

15. The method of claim 9 wherein the first signal includes at least one global positioning system (GPS) coordinate which identifies the location of the PCD in the automobile and wherein the modified driver zone is defined by data that corresponds to at least one stored GPS coordinate.

16. The method of claim 15 further comprising comparing the at least one GPS coordinate of the first signal to the at least one stored GPS coordinate to determine if the at least one PCD is in the modified driver zone.

17. An automobile comprising:
a receiver; and
a controller including the receiver to:
    receive a first signal indicating that a cellphone is in a driver zone;
    receive a second signal indicating that a passenger is not in a passenger zone;
    receive, after the first signal, a third signal indicating that the cellphone is in the passenger zone; and
    establish a modified driver zone including the driver and passenger zones responsive to the second and third signals.

18. The automobile of claim 17 wherein the controller is further configured to determine transmission status for the automobile.

19. The automobile of claim 18 wherein the controller is further configured to transmit a vehicle status signal to the cellphone for restricting usage thereof in the modified driver zone in response to the transmission status indicating that the automobile is in a non-PARK condition.

20. The apparatus of claim 17 wherein the modified driver zone is larger than the driver zone.

* * * * *